United States Patent [19]

Fellows

[11] Patent Number: 5,216,535
[45] Date of Patent: Jun. 1, 1993

[54] OPTICAL DEFLECTION DEVICE

[76] Inventor: William G. Fellows, 8610 Snowden Loop, Laurel, Md. 20708

[21] Appl. No.: 718,321

[22] Filed: Jun. 17, 1991

[51] Int. Cl.$^5$ ............... G02F 1/03; G02F 1/29; G02B 1/06; G01N 21/84
[52] U.S. Cl. ............... 359/245; 359/299; 359/667; 356/432
[58] Field of Search ............... 359/299, 321-322, 359/245, 196, 667, 664; 356/432, 134

[56] References Cited

U.S. PATENT DOCUMENTS

| | | | |
|---|---|---|---|
| 4,099,879 | 7/1978 | Britz | 359/667 |
| 4,233,571 | 11/1980 | Wang et al. | 372/99 |
| 4,331,388 | 5/1982 | McCrobie et al. | 359/667 |
| 4,402,574 | 9/1983 | McConnel | 359/667 |
| 4,512,639 | 4/1985 | Roberts et al. | 359/667 |
| 4,582,398 | 4/1986 | Roberts et al. | 359/667 |
| 4,585,301 | 4/1986 | Bialkowski | 359/243 |
| 4,714,902 | 12/1987 | Rokni et al. | 359/299 |
| 4,740,062 | 4/1988 | Rodriguez | 359/667 |
| 4,758,072 | 7/1988 | Harrigan | 359/667 |
| 4,869,578 | 9/1989 | Fukuda | 359/300 |
| 4,869,579 | 9/1989 | Fischer | 359/299 |
| 4,940,333 | 7/1990 | Pawliszyn | 356/432 |

Primary Examiner—Bruce Y. Arnold
Assistant Examiner—Evelyn A. Lester
Attorney, Agent, or Firm—Saul Elbaum; Jason M. Shapiro

[57] ABSTRACT

An optical deflection device for redirecting and/or focusing a high-power collimated beam of light, comprising an optically transparent gas-filled hollow sphere, and a plurality of gas-filled lenses positioned within the sphere. When photorefractive or optically non-linear gases are used within the sphere and lenses, a second beam of light made to travel along the path of the original beam, will result in a local change of refractive index of the gas, thereby altering the path of the original beam. In separate embodiments thereof, the lenses may be mechanically repositioned, the internal pressure of the sphere varied, or a combination of these and the foregoing accomplished.

14 Claims, 6 Drawing Sheets

OPTICAL DEFLECTION DEVICE

GOVERNMENTAL INTEREST

The invention described herein may be manufactured, used and licensed by or for the U.S. Government for governmental purposes without the payment to us of any royalties thereon.

BACKGROUND OF THE INVENTION

Most conventional optical deflection devices involve the use of optically flat mirrors, either alone or in combination. An advantage to using this type of mirror, as opposed to crystalline or reflective lenses, is that a collimated beam of light can be redirected without significant divergence or focusing. This becomes important in applications where the deflected beam must be detectable at great distances.

A typical mirror is formed by depositing a reflective coating, such as gold, upon an optically flat substrate. These surfaces, however, can be seriously degraded, or even vaporized by a sufficiently powerful optical signal. Laser-based communications networks or weapon systems positioned in space could employ such high energy laser beams.

As an alternative to mirrors, it is possible to use transparent optical flats to deflect a beam of light. If a glass or quartz flat is oriented at an oblique angle to an incoming beam of light, a controlled deflection will result owing to the increased refractive index of the glass or quartz. Unfortunately, crystalline flats used in this way will produce little deflection, and because their refractive indices are fixed, the deflection may only be controlled by mechanically repositioning the flat.

Most electronic and electro-optic beam steering techniques are based on the use of periodic changes in a crystal's refractive index due to acousto-optic or photorefractive effects. See Sincerbox, G. T., Roosen, G., "Opto-optical Light Deflection," *Applied Optics*, Vol. 22, No. 5, 690 (1983). Thus, Fischer, et. al., U.S. Pat. No. 4,869,579, teaches the use of a third order nonlinear crystal such as $BaTiO_3$, together with two incident pumping beams differing in either phase or frequency, to create a periodic variation of refractive index, or index grating, such that the beams are diffracted at a controllable angle.

Thermal effects were used by Bialkowski, U.S. Pat. No. 4,585,301, to create an optical switch within a photorefractive material. A control beam passing through the medium sets up a thermal lens or gradient. A second beam is deflected by the "lens" to a prepositioned detector. The invention does not rely on the change in refractive index at the interface of an on-linear material, nor is it limited to a localized change in the refractive index (i.e. not making use of reflection). For this reason, Bialkowski suggests the use of FREON 12 as an absorbing gas to create the thermal gradient, and argon as an inert gas for mixing.

When non-linear optical gases have been used, it has mainly been to produce phase conjugate replicas of an incident beam, typically in reflection. See Fukuda, U.S. Pat. No. 4,869,578; Wang et al., U.S. Pat. No. 4,233,571. Fukuda teaches a gas-dynamic phase-conjugated mirror, and notes that non-linear gases, as opposed to non-linear liquids or solids, can withstand very hig light intensities ($>2\times10^9$ W/cm$^2$). For this reason, phase conjugating mirrors have found use in laser fusion applications.

In situations where it is desirable to focus a laser beam on targets at great distances in space, it is necessary to use focusing optics with very large output apertures (up to 5 meters in diameter) and near diffraction limited performance. Crystalline lenses of this size are difficult to produce with good optical quality, and may be too heavy to boost into space. Additionally, a crystalline lens is limited to but one focal length as a consequence of its shape and refractive index.

Roberts and Honeycutt, U.S. Pat. No. 4,512,639 (1985), teaches an erectable large optic for outer space applications utilizing a gas dynamic lens of fixed focal length. Jets of gas having a refractive index, n, are used to deflect and focus a diverging laser source. As the gas disperses, the refractive index of the gas decreases so that the index varies from the outer boundary of the lens to its inner boundary. Nitrogen, helium, and oxygen are listed as possible gases for this use.

To overcome focal length limitations, Roberts and Honeycutt, U.S. Pat. No. 4,582,398 (1986), suggests the use of a large continuously focusable gas lens. Essentially a large balloon, it is fabricated from a material such as chloride/vinylidene chloride copolymer (Saran wrap), and is inflated using gas dynamic nozzles. To alter the focal length of the balloon it is mechanically deformed, making changes in deflection slow and inaccurate.

A gas zoom lens is described by McCrobie et al., U.S. Pat. No. 4,331,388 (1982) for use with a camera. A plurality of conventional lenses are positioned around a central cavity which is filled with an optically transparent gas such as FREON. By altering the cavity pressure the refractive index of the gas is changed, thereby allowing variable focal lengths. This magnification system, however, is of little use as a beam steerer or deflector. In space-based applications, for example, the crystalline optics would prove too heavy, and their fabrication too costly.

Accordingly, it is an object of the present invention to provide an optical deflection device comprising only gas-filled optics to achieve high optical quality, low attenuation, light weight construction, and the ability to withstand very intense beams of light.

It is another object of the present invention to provide an optical deflection device comprising only gas-filled optics, which allows rapid variation of a beam's direction through the use of photorefractive gases, which upon optical stimulation experience a change in refractive index and affect the path of a second beam of light.

It is still another object of the present invention to provide an optical deflection device comprising only gas-filled optics, which allows rapid variation of a beam's direction through the use of optically non-linear gases, which upon optical stimulation set up stimulated Brillouin scattering, which in turn causes acoustic waves to be generated by electrostriction. As a result, the density, and therefore the refractive index, of the non-linear medium is modified in response to the optical signal, and the path of a second optical beam may be altered.

It is also an object of the present invention to provide an optical deflection device comprising only gas-filled optics, which in addition to having means for opto-optical deflection, is provided with means to either mechanically position the gas lenses, or to alter the pressure of the gas in at least one of the lenses.

SUMMARY OF THE INVENTION

The present invention relates to an optical deflection device for redirecting and/or focusing a high-power beam of light. A hollow optically transparent sphere is filled with an optically transparent gas having a refractive index related to the pressure within the sphere. Two or more hollow lenses are positioned within the sphere, and are filled with an optically transparent gas having a refractive index related to the pressure within the lens. If a collimated beam of light is made to pass through the gas-filled sphere and lenses, it will be deflected and/or focused in accordance with Snell's Law and geometric optics.

The present invention additionally provides for the hollow sphere and lenses to be filled with a photorefractive gas, such that when means are provided for directing a second beam of light through the gas-filled optics, the path of the original beam will be altered in response to the second.

The present invention further provides for the hollow sphere and lenses to be filled with an optically non-linear gas, such as methane, such that when means are provided for directing a second beam of light through the gas-filled optics, stimulated Brillouin scattering will be produced along with a concomitant change in refractive index, thereby altering the path of the original beam in response to the second.

The present invention also provides, in addition to the foregoing, means for rotating the gas-filled lenses and/or to regulate the internal pressure of the hollow sphere. Thereby producing greater deflections or alternate means of deflection.

The present invention further provides a method for steering an optical beam, comprising directing a first beam such that it intercepts the sphere, transmitting the beam through a plurality of gas-filled lenses within the sphere, outputting the beam from the sphere, monitoring the reflected intensity of the beam with photodetectors, and moving the convex lenses through mechanical means to control the deflection of the beam.

The present invention also provides a method for steering an optical beam, comprising the foregoing steps, but varying the internal pressure of the sphere to control the deflection of the beam, rather than moving the convex lenses.

The present invention additionally provides a method for steering an optical beam, wherein the optics are filled with a photorefractive gas, and means are provided for directing a second beam of light through the sphere, thereby altering the path of the first.

The present invention further provides a method for steering an optical beam, wherein the optics are filled with an optically non-linear gas, and means are provided for directing a second beam of light through the sphere, thereby altering the path of the first.

It is an aspect of this invention to provide a hollow lens filled with an optically non-linear gas, such as methane. The hollow lens may be fabricated from an optically transparent, rigid material, such as quartz, and may be double convex.

BRIEF DESCRIPTION OF THE DRAWINGS

The preferred embodiments of the present invention will be described with reference to the accompanying drawings.

DESCRIPTION OF THE PREFERRED EMBODIMENTS

Figure 1:
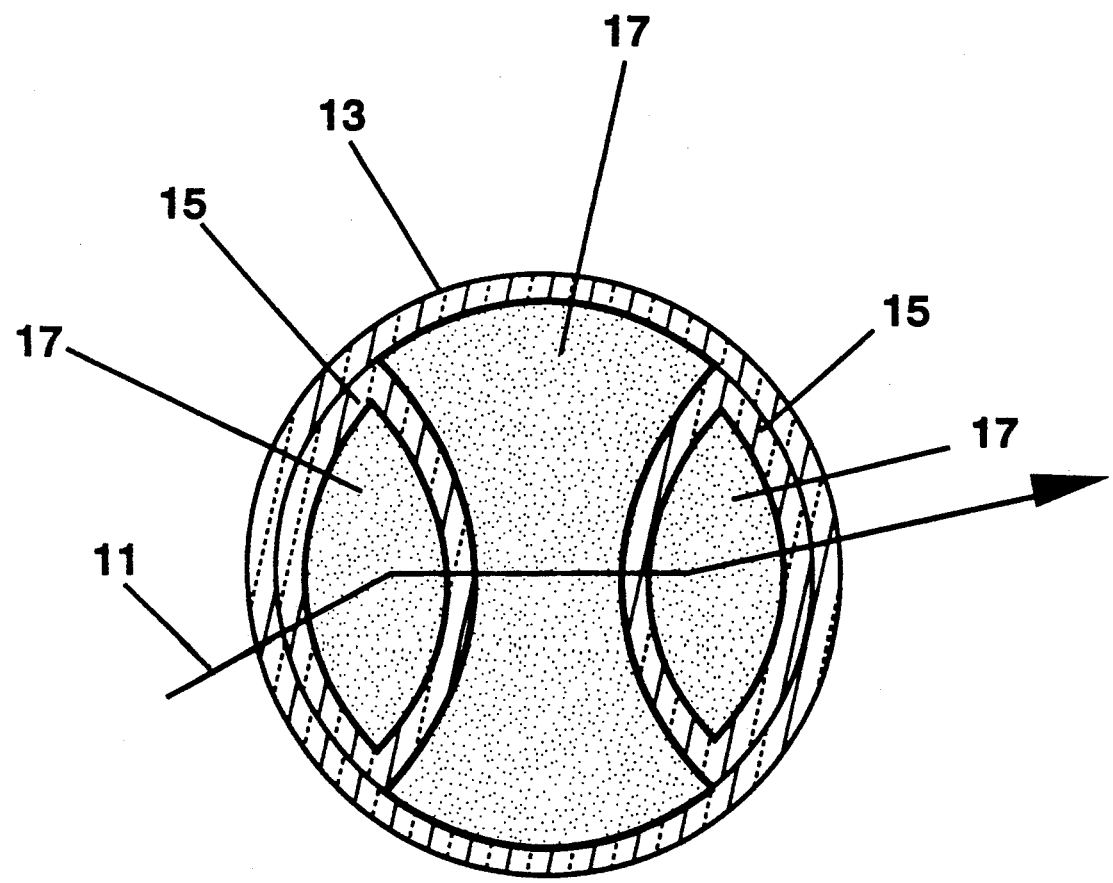
FIG. 1 is a cross-sectional view of the optical deflection device using static lenses and linear gases.

FIG. 1 illustrates an embodiment of the optical deflection device employing no moving parts. The deflection of an incoming beam of light (the signal) 11, is controlled by positioning the optical deflection device as if it were a lens or mirror of fixed focal length. The beam 11 intercepts an optically transparent spherical housing 13, passes through one of a plurality of gas-filled lenses 15, through the gas-filled interior of the sphere 13 and other lenses 15, and emerges as a redirected and/or focused beam.

The housing 13 and lenses 15 may be flexible or rigid depending on the application. In space, where payload size and weight must be minimized, an inflatable plastic housing may be desirable. In the laboratory, or in laser-based machining processes, rigid materials would suffice. Suitable housing and lens materials include, but are not limited to quartz, optical quality glasses such as NESA, and rigid plastics. The wall thicknesses should be such that within the range of operating pressures the deformation of the housing and lenses is wholly elastic (i.e. able to be calculated), and the beam deflection is minimized within the wall itself.

The lenses 15 may be double convex, single convex, flat, double concave, single concave, or any other shape depending on the application. In addition, all of the lenses 15 need not be the same shape, particularly where collimation is desired and the sphere is not large enough to accommodate two lenses of the same focal length.

The actual deflection of the incident beam can be calculated using Snell's law, which is written:

$$n_o \sin\alpha = n \sin\beta$$

where $n_o$ is the refractive index of the first medium, $\alpha$ is the angle of incidence relative the axis normal to the interface, $n$ is the refractive index of the second medium, and $\beta$ is the angle of emergence into the second medium. If the wall thickness of the housing is kept to a minimum, the majority of the deflection will occur in the gas medium within the housing 13 and lenses 15.

At a given temperature the refractive index of the gas 17 is directly proportional to its density, and therefore to its pressure. By filling the housing 13 and lenses 15 with optically transparent gases at a predetermined pressure it is possible to fix the refractive index of each of these optical components. The gas pressure within the lenses 15 need not be the same as that within the sphere. In fact, were it the same, the lenses would serve little purpose in this embodiment. Suitable gases include $N_2$, $H_2$, $O_2$, A, and Ne among others.

Figure 2:
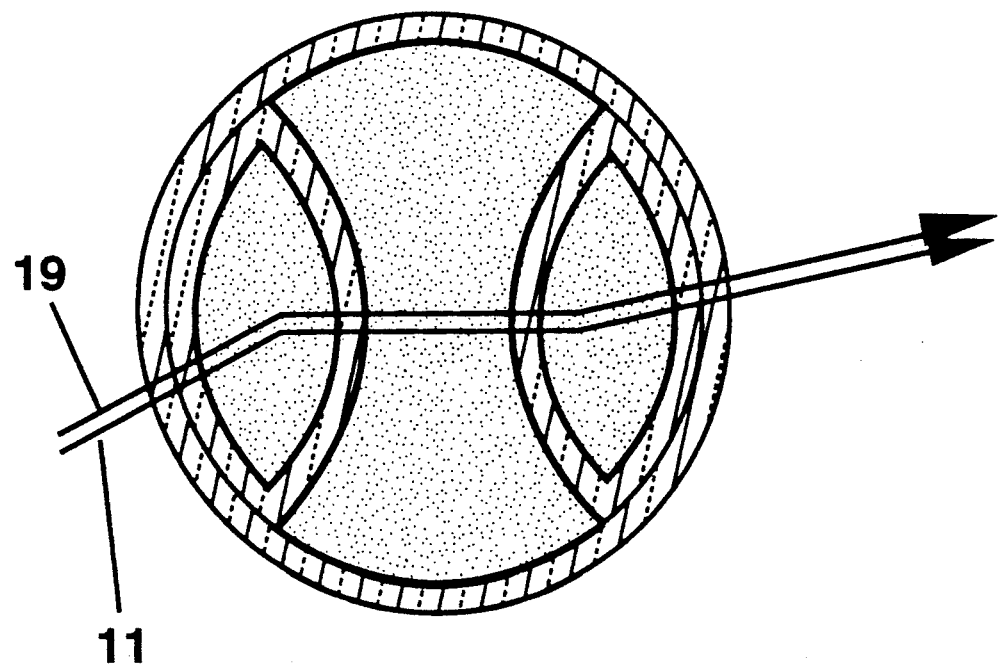
FIG. 2 is a cross-sectional view of the optical deflection device using static lenses and either photorefractive or optically non-linear gases.

In a second embodiment, illustrated in FIG. 2, the aforementioned housing 13 and lenses 15 are filled with a photorefractive gas 17, such as Freon 12. When a second beam of light (the control beam) 19, is transmitted into the photorefractive medium 17, a local change in the refractive index of the medium is accomplished through either thermal absorption, spectroscopic transitions, or photochemical processes, depending on the gas. The path of the signal beam 11 is thereby altered in response to the presence of the control beam 19. The intensity of the control beam 19 can be altered to control the refractive index of the medium 17 in a predetermined manner. The control beam 19 may be of a different wavelength than the signal beam 11, and may be either pulsed or continuous.

In another embodiment, the housing 13 and lenses 15 are filled with an optically non-linear gas 17 such as $CH_4$. Other suitable gases include, but are not limited to, Xe, $C_2F_6$, $CClF_3$, or $SF_4$. A non-linear gas is also one whose refractive index changes in response to the intensity of an incident beam of light. However, the mechanism by which this occurs is photoacoustic, and comes about as a result of stimulated Brillouin scattering within the medium. Above certain threshold pressures non-linear gases may act as a "mirror", and actually reflect the phase conjugate of an incident beam.

It is an object of the present invention, however, to operate at pressures below the phase conjugation threshold (100 atmospheres for $CH_4$), so that the signal beam 11 may be transmitted without appreciable loss due to reflection. This, in addition to the fact that non-linear gases can withstand very high light intensities ($>2 \times 10^9 W/cm^2$), make non-linear gases a good choice for opto-optical deflection.

Figure 3:
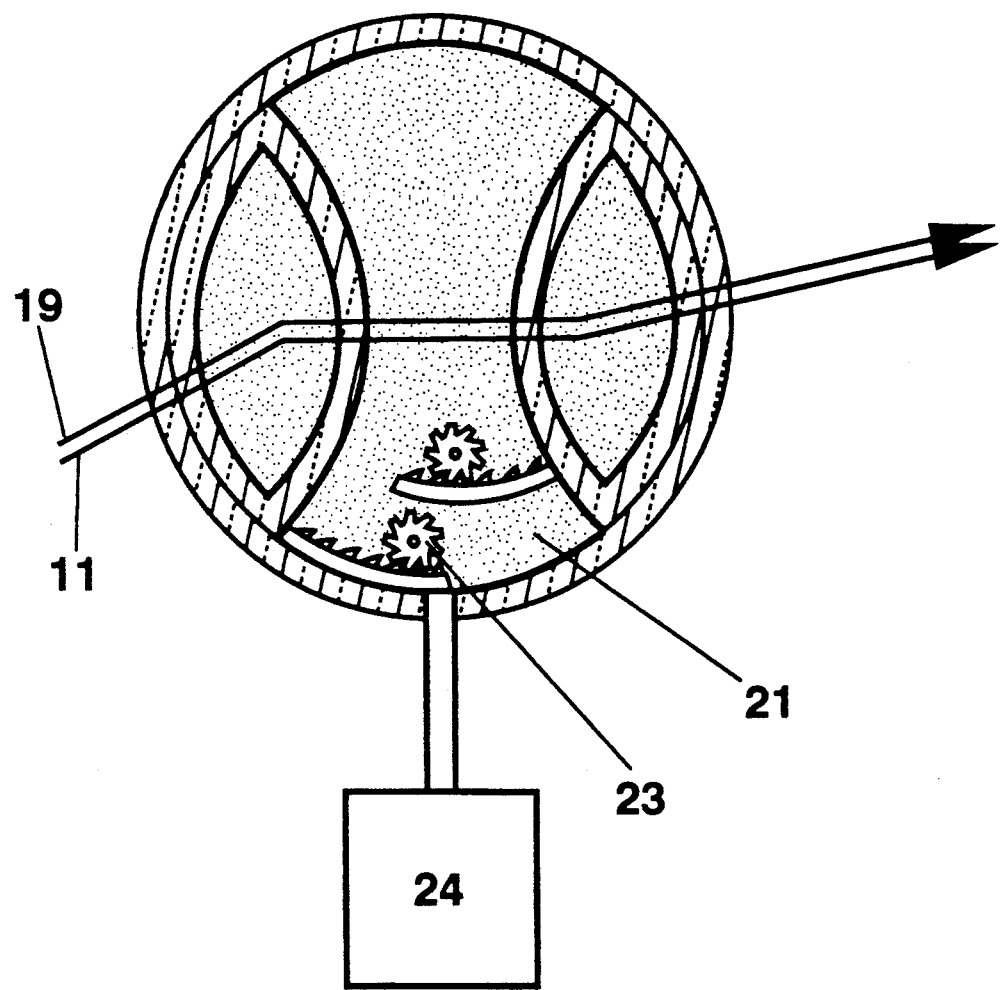
FIG. 3 is a cross-sectional view of the optical deflection device with means to position the lenses.

In another embodiment, illustrated in FIG. 3, mechanical means 21, 23, 24 are provided for positioning the lenses 15 in relation to the signal beam 11, thereby providing an independent or additional means for controlling deflection. In a possible configuration, the lenses 15 are mounted on rails 21, which may be moved by gears 23, driven by a servo-motor 24. Other possibilities include spring loaded mechanisms, hydraulic actuators, piezo-electric devices, or other means known to those skilled in the art.

Figure 4:
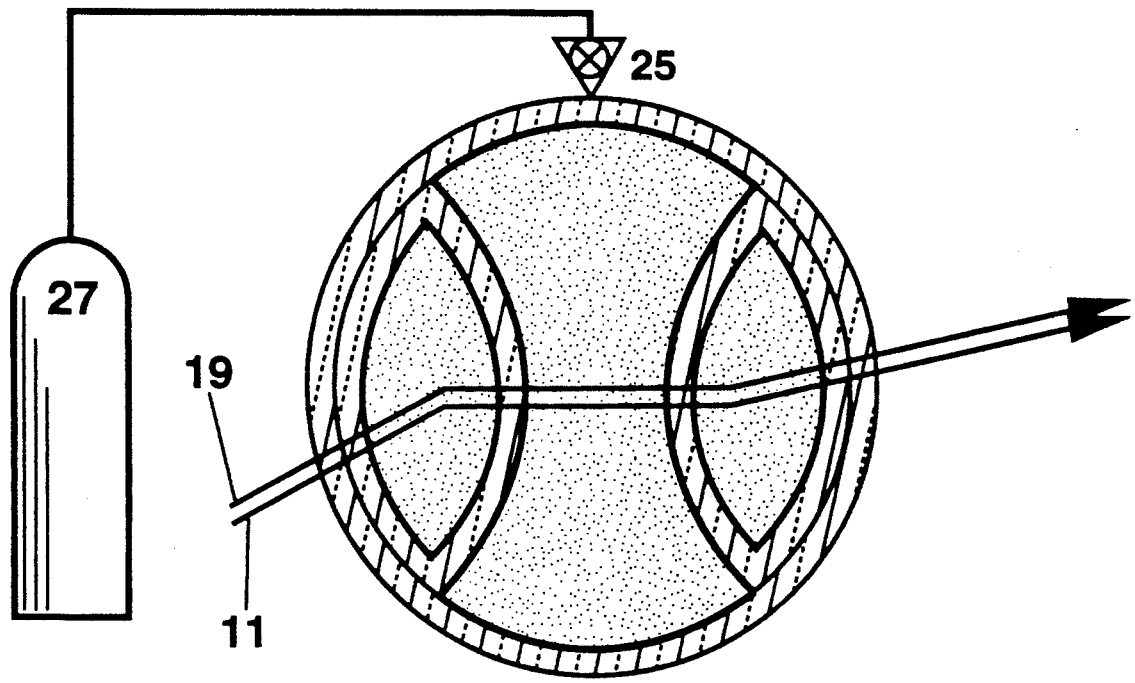
FIG. 4 is a cross-sectional view of the optical deflection device with means for altering the internal pressure of the sphere.
Figure 5:
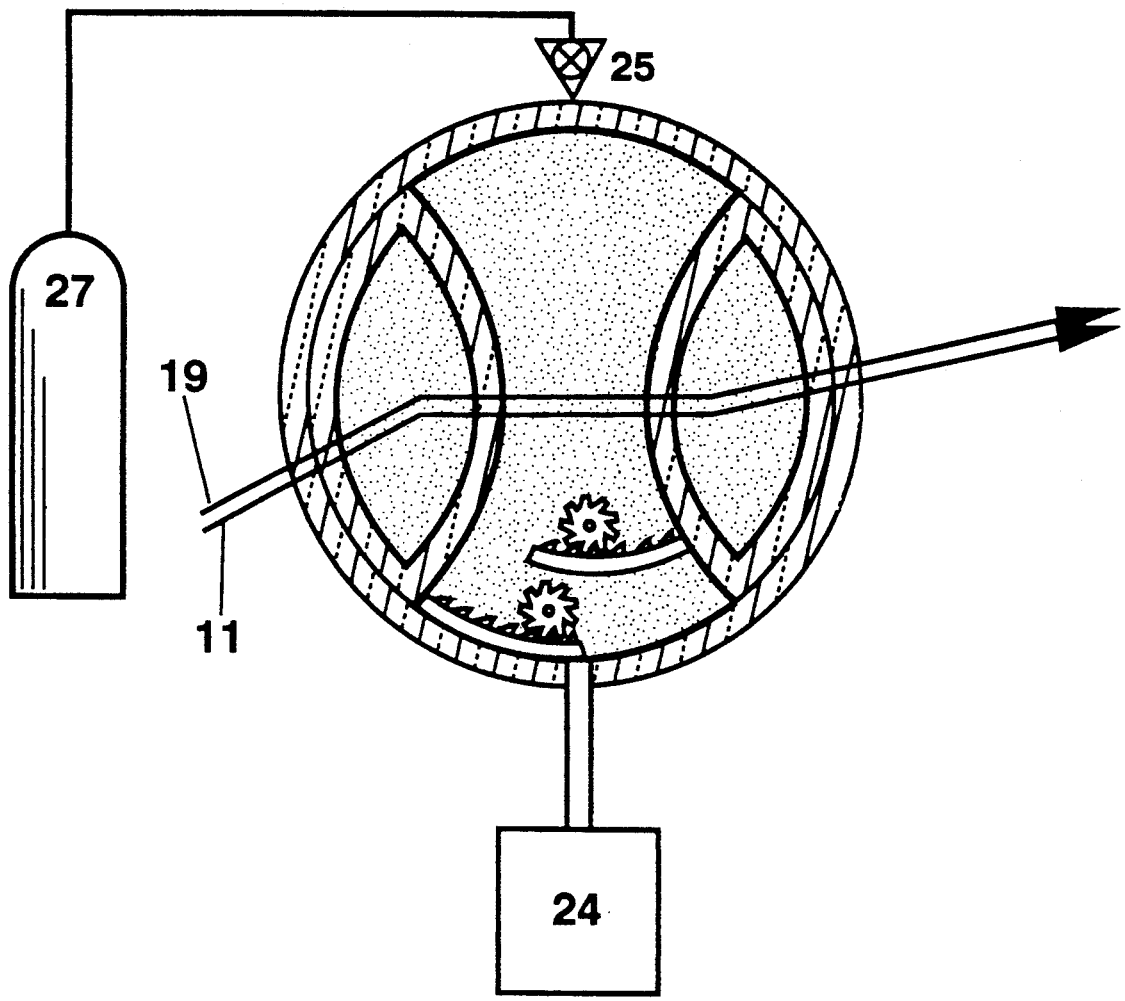
FIG. 5 is a cross-sectional view of the optical deflection device with means to position the lenses and to alter the internal pressure of the sphere.

FIG. 4 illustrates the use of a pressure valve 25 and gas source 27 to alter the pressure of the gas contained within the spherical housing 13. Another possible means of controlling the pressure would be to employ heaters. As mentioned previously, the pressure of a gas is directly proportional to its refractive index. Thus, by increasing or decreasing the pressure of the gas, it is possible to control the deflection of the signal beam 11 either independently or in conjunction with other means (see FIG. 5).

Figure 6:
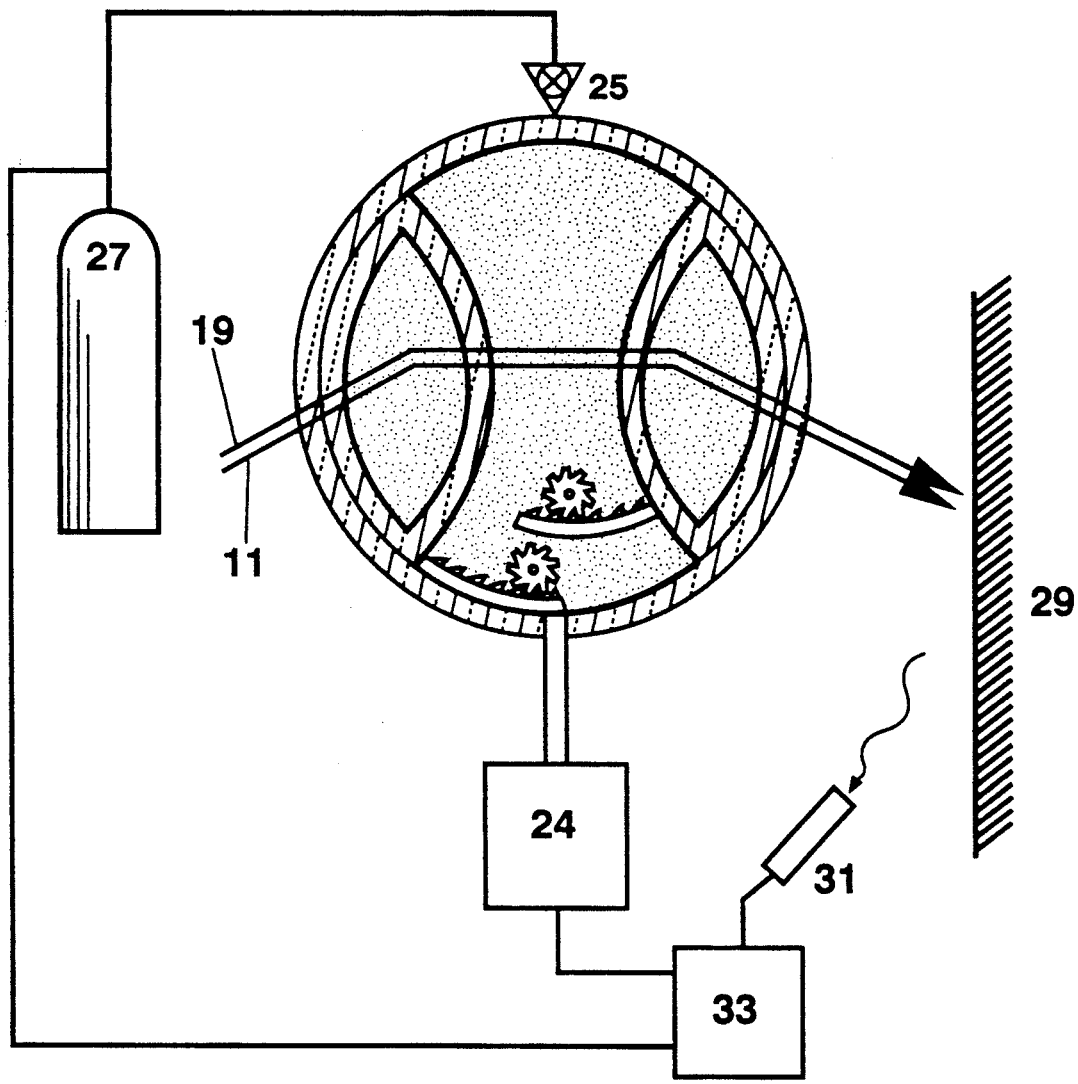
FIG. 6 is a schematic diagram of a method for controlling the deflection of an optical beam.

If the optical deflection device is used to steer a beam in machining processes as illustrated in FIG. 6, where the target 29 is accessible, it is possible to position one or more photodetectors 31 to monitor the reflected intensity. This information can then be processed as part of an external feedback loop 33 which would alter the intensity of the control beam 19, the position of the lenses 15, and/or the gas pressure within the spherical housing 13 to adjust the deflection of the beam 11. Since, in most applications the light intensity will be strong, photodiodes and photoresistors are possible detectors.

Where precise machining is desired, an aiming process for directing the deflected laser light can be achieved by employing either a dual laser system having a low intensity pointing beam 19 and a high intensity cutting beam 11, or a single beam having dual intensities. The aiming beam 11 is first passed through the optical deflection device and its position on the target 29 monitored using photodetectors 31. The position of the aiming beam 11 is fed back to the control system 33, which in turn adjusts the position of the beam 11 more precisely. When the desired position is achieved, the higher energy laser beam 11 is transmitted through the optical deflection device and onto the target 29.

While there has been described and illustrated specific embodiments of the invention, it will be obvious that various changes, modifications, and additions, can be made herein without departing from the field of the invention which should be limited only by the scope of the appended claims.

I claim:

1. An optical deflection device comprising:
   means for providing a collimated optical beam;
   a hollow optically transparent sphere in the path of said beam, wherein said sphere contains an optically transparent gas, said gas having a refractive index related to the pressure under which it is contained, and said sphere being positioned in the path of said beam;
   a plurality of hollow lenses, wherein said lenses are positioned within said sphere and are filled with an optically transparent gas having a refractive index related to the pressure under which it is contained;
   whereby a predetermined deflection of said beam may be produced by altering the position of said sphere within the path of said beam.

2. The invention of claim 1 wherein:
   said gas is photorefractive;
   means are provided for directing a first optical beam into said sphere;
   means are provided for directing a second optical beam of selectively variable intensity along the same path in said sphere, whereby the path of the first optical beam varies in response to the intensity of the second optical beam as it passes through the sphere as a result of local changes in refractive index.

3. The invention of claim 1 wherein:
   said gas is optically non-linear;
   means are provided for directing a first optical beam into said sphere;
   means are provided for directing a second optical beam of selectively variable intensity along the same path in said sphere, whereby the path of the first optical beam varies in response to the intensity of the second optical beam as it passes through the sphere as a result of changes in refractive index associated with stimulated Brillouin scattering.

4. The invention of claim 3 wherein said non-linear gas is methane.

5. The invention of claims 1, 2, 3, or 4 further comprising:
   means for rotating said lenses within the sphere;
   whereby variable deflection of the first beam may be produced without varying the intensity of the second beam, or larger deflections may be produced through variation of both the position of said lenses and the intensity of the second beam.

6. The invention of claims 1, 2, 3, or 4 further comprising:

means for varying the pressure of said gas within the spherical housing;

whereby variable deflection of the first beam may be produced without varying the intensity of the second beam, or larger deflections may be produced through variation of both the pressure of said gas within the sphere and the intensity of the second beam.

7. The invention of claims 1, 2, 3, or 4 further comprising:
  means for rotating the lenses within said sphere;
  means for varying the pressure of said gas within the spherical housing;

whereby variable deflection of the first beam may be produced without varying the intensity of the second beam, or larger deflections may be produced through variation of the pressure of said gas, the position of said lenses, and the intensity of the second beam.

8. A method for steering an optical beam, said method comprising:
  (a) directing a first beam into a gas-filled hollow sphere;
  (b) transmitting said beam through a plurality of gas-filled convex lenses within said sphere, said lenses being connected to means for rotation within said sphere;
  (c) outputting said beam from the sphere;
  (d) monitoring the reflected intensity of said beam with photodetectors; and
  (e) moving said convex lenses to control the deflection of said beam.

9. A method for steering an optical beam, said method comprising:
  (a) directing a first beam into a gas-filled hollow sphere, said sphere having means for varying the internal pressure of said gas;
  (b) transmitting said beam through a plurality of gas-filled convex lenses within said sphere;
  (c) outputting said beam from the sphere;
  (d) monitoring the reflected intensity of said beam with photodetectors; and
  (e) varying the internal pressure of said sphere to control the deflection of said beam.

10. A method for steering an optical beam, said method comprising:
  (a) directing a first beam of low intensity into a gas-filled hollow sphere, said sphere having means for varying the internal pressure of said gas;
  (b) transmitting said beam through a plurality of gas-filled convex lenses within said sphere;
  (c) outputting said beam from the sphere;
  (d) monitoring the reflected intensity of said beam with photodetectors; and
  (e) moving said convex lenses to control the deflection of said beam.
  (f) directing a second beam of high intensity into said gas-filled hollow sphere;
  (g) transmitting said second beam through a plurality of gas-filled convex lenses within said sphere;
  (h) outputting said second beam from the sphere and onto said target.

11. A method for steering an optical beam, said method comprising:
  (a) directing a first beam of low intensity into a gas-filled hollow sphere;
  (b) transmitting said beam through a plurality of gas-filled convex lenses within said sphere, said lenses being connected to means for rotation within said sphere;
  (c) outputting said beam from the sphere;
  (d) monitoring the reflected intensity of said beam with photodetectors; and
  (e) moving said convex lenses to control the deflection of said beam.
  (f) directing a second beam of high intensity into said gas-filled hollow sphere;
  (g) transmitting said second beam through a plurality of gas-filled convex lenses within said sphere;
  (h) outputting said second beam from the sphere and onto said target.

12. The invention of claims 8, 9, 10 or 11 wherein said gas is photorefractive.

13. The invention of claims 8, 9, 10 or 11 wherein said gas is optically non-linear.

14. The invention of claims 8, 9, 10 or 11 wherein said gas is methane.

* * * * *